(12) United States Patent
Uozumi et al.

(10) Patent No.: US 8,231,722 B2
(45) Date of Patent: Jul. 31, 2012

(54) INJET PRINTING METHOD AND INK SET

(75) Inventors: Shunsuke Uozumi, Tokyo (JP); Sayako Arai, Tokyo (JP); Shin-ichiro Shimura, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 440 days.

(21) Appl. No.: 12/576,870

(22) Filed: Oct. 9, 2009

(65) Prior Publication Data
US 2010/0092676 A1    Apr. 15, 2010

(30) Foreign Application Priority Data

Oct. 10, 2008  (JP) ................................. 2008-263637
Jun. 11, 2009  (JP) ................................. 2009-140516

(51) Int. Cl.
*C09D 11/02*    (2006.01)
*B05D 5/00*     (2006.01)

(52) U.S. Cl. ..................................... 106/31.26; 427/256
(58) Field of Classification Search ............... 106/31.26, 106/31.27, 31.6; 427/265
See application file for complete search history.

(56) References Cited

U.S. PATENT DOCUMENTS

| | | | | |
|---|---|---|---|---|
| 5,637,137 A | * | 6/1997 | Okuda et al. | 106/31.26 |
| 5,853,465 A | * | 12/1998 | Tsang et al. | 106/31.26 |
| 6,022,908 A | * | 2/2000 | Ma et al. | 523/160 |
| 6,190,444 B1 | * | 2/2001 | Okuda et al. | 106/31.26 |
| 6,632,272 B2 | * | 10/2003 | Hayashi et al. | 106/31.26 |
| 6,699,312 B2 | * | 3/2004 | Hayashi et al. | 106/31.26 |
| 6,758,888 B2 | * | 7/2004 | Ogawa et al. | 106/31.26 |
| 7,172,275 B2 | * | 2/2007 | Hiraoka et al. | 347/100 |
| 7,717,989 B2 | * | 5/2010 | Okuda et al. | 106/31.26 |
| 2009/0196994 A1 | * | 8/2009 | Endo | 427/256 |

FOREIGN PATENT DOCUMENTS

| | | |
|---|---|---|
| JP | A-H5-177123 | 7/1993 |
| JP | A-H05-202328 | 8/1993 |
| JP | A-2005-350563 | 12/2005 |
| JP | A-2006-56931 | 3/2006 |

* cited by examiner

*Primary Examiner* — Helene Klemanski
(74) *Attorney, Agent, or Firm* — Fitch, Even, Tabin & Flannery, LLP

(57) ABSTRACT

In an inkjet printing system using an emulsion ink, it is aimed that printing density is improved particularly for a normal paper. An inkjet printing method is provided, in which printing is performed by ejecting one of first and second inks onto a printing medium, and then successively ejecting the other ink so as to overlay it in the one ink, wherein the first ink is a water-in-oil (W/O) emulsion ink comprising the coloring material which is provided with an acidic group on a surface in the water phase, and the second ink is a water-in-oil (W/O) emulsion ink comprising a polyvalent metal salt in the water phase. Preferable acidic group is carboxylic group, sulfuric acid group and phosphoric group. Preferable polyvalent metal salt is a salt composed of metal ions such as $Ca^{++}$, $Cu^{++}$, $Ni^{++}$, $Mg^{++}$, $Zn^{++}$, $Ba^{++}$, $Al^{+++}$, $Fe^{+++}$ and $Cr^{+++}$.

8 Claims, No Drawings

INJET PRINTING METHOD AND INK SET

CROSS-REFERENCE TO RELATED APPLICATIONS

This is a utility patent application that claims the benefit of priority under 35 U.S.C. §119 based on Japanese Application Nos. 2008-263637, filed Oct. 10, 2008 and 2009-140516 filed Jun. 11, 2009, the entire disclosure of which are hereby incorporated herein by reference.

TECHNICAL FIELD

The present invention relates to an inkjet printing method which improves printing density by inhibiting ink permeation into printing media so as to prevent strike through and bleeding, and also relates to an ink set used for the printing method.

BACKGROUND ART

Inkjet inks used for inkjet printing system are generally classified into aqueous inks and oil inks.

Aqueous inks have small dot gain compared with oil inks and thus are suitable for obtaining images high in resolution and density, and generally used in inkjet printers for office and domestic uses. Also, in order to prevent bleeding of an aqueous ink so as to achieve image printing with higher resolution, there has been proposed a printing method in which a treatment solution reactive with the aqueous ink is first ejected onto a printing medium, and then the ink is ejected so as to overlay the treatment solution, whereby coloring materials contained in the ink aggregate (refers to Patent Document 1).

However, aqueous inks are small in dot gain, and thus are unsuitable for low resolution printing. The printing method using an aqueous ink together with the above treatment solution is further unsuitable for low resolution printing because it makes dot gain further smaller. Also, when aqueous inks are printed on plain paper, they easily provide prints with curls, and thus are inferior in conveyance of prints and unsuitable for high-speed printing.

In contrast, oil inks have large dot gain compared with aqueous inks, and do not provide prints with curls even when they are printed on plain paper, and thus are suitable for high-speed printing with low resolution. Also, oil inks volatize solvents less than aqueous inks, and thus are advantageous in that clogging in ink nozzles is unlikely to occur, thereby reducing frequency of cleaning of ink nozzles, and thus are suitable for high-speed printing, particularly high-speed line head inkjet printing system (Patent Document 2).

However, oil inks are defective in that they are low in printing density and easily cause strike through or bleeding since the coloring material and the solvent are highly compatible with each other so that the coloring material easily permeates together with the solvent into printing media but can hardly stay on a surface of the printing media.

It has been already proposed that an emulsion ink is used in an inkjet printer in order to solve the problems of printed dot size and printing density that both aqueous and oil inks possess (Patent Document 3).

However, the conventional emulsion ink has only achieved a property which is intermediate between aqueous inks and oil inks, but does not have much difference from oil inks in printing density, in particular.

[Patent Document 1] JP-A-H05-202328
[Patent Document 2] JP-A-2005-350563
[Patent Document 3] JP-A-2006-56931

DISCLOSURE OF THE INVENTION

Problems to be Solved by the Invention

The present invention relates to an inkjet printing system using an emulsion ink, and aims at improving printing density, particularly on plain paper.

Means for Solving the Problem

As a result of diligent researches for the above mentioned object, the present inventors have found that the inkjet printing system in which printing is performed by ejecting one of first and second inks onto a printing medium, and then successively ejecting the other ink so as to overlay it on the one ink that has been ejected onto the printing medium, can be improved in printing density and prevented from striking-through and bleeding by using a water-in-oil (W/O) emulsion ink comprising, in a water phase thereof, a specific coloring material as the first ink, and using a water-in-oil (W/O) emulsion ink comprising, in a water phase thereof, a compound having a property of allowing the specific coloring material to aggregate as the second ink, so that when the first and second inks are ejected to overlap each other on the printing medium so as to mix together the water phases of both inks, the coloring material contained in the water phase of the first ink is caused to be aggregated and stayed on the printing medium and is also inhibited from permeating into the printing medium. Thus, the present invention is finally completed.

That is, according to one aspect of the present invention, there is provided an inkjet printing method which comprises ejecting one of first and second inks onto a printing medium, and then successively ejecting the other ink so as to overlay it on the one ink, wherein the first ink is a water-in-oil (W/O) emulsion ink comprising a coloring material in a water phase thereof, said coloring material having an acidic group on a surface thereof, and wherein the second ink is a water-in-oil (W/O) emulsion ink comprising a polyvalent metal salt in a water phase thereof.

According to another aspect of the present invention, there is provided an ink set for inkjet printing by ejecting one of first and second inks onto a printing medium, and then successively ejecting the other ink so as to overlay it on the one ink, wherein the first ink which is a water-in-oil (W/O) emulsion ink comprising a coloring material in a water phase thereof, said coloring material having an acid group on a surface thereof, and wherein the second ink is a water-in-oil (W/O) emulsion ink comprising a polyvalent metal salt in a water phase thereof.

According to a preferable embodiment of the present invention, the coloring material is one having, on a surface thereof, at least one acidic group selected from the group consisting of carboxylic acid group, sulfuric acid group and phosphoric acid group, and the polyvalent metal salt contained in the water phase of the second ink is a salt which is constituted by at least one metal ion selected from the group consisting of $Ca^{++}$, $Cu^{++}$, $Ni^{++}$, $Mg^{++}$, $Zn^{++}$, $Ba^{++}$, $Al^{+++}$, $Fe^{+++}$ and $Cr^{+++}$. Aggregation of the coloring material during printing can be definitely caused by using the above-mentioned specific compounds as the coloring material and the polyvalent metal salt which are contained in the water phase of the first and second inks, respectively. The coloring material contained in the water phase of the first ink is preferably a dye or self-dispersing pigment which has a carboxylic acid group on a surface thereof.

According to another preferable embodiment of the present invention, the first and/or second ink comprises a coloring material in an oil phase. In this case, further improvement in printing density can be expected by printing the first and second inks to overlap each other.

EFFECT OF THE INVENTION

According to the present invention, the water phase of the first water-in-oil (W/O) emulsion ink contains a specific coloring material, and the water phase of the second water-in-oil (W/O) emulsion ink contains a compound having a property of allowing the coloring material to aggregate. Thus, when the first and second inks are ejected onto a printing medium so as to overlap each other and mix the water phases of both inks together, the coloring material contained in the water phase of the first ink is caused to be aggregated and kept on the surface of the printing medium, and the coloring material is inhibited from permeating into the printing medium, and thus printing density is improved and strike through and bleeding are prevented concurrently. This aggregation is considered to be caused by crosslinking of acid groups of coloring materials with polyvalent metal ions.

BEST MODE FOR CARRYING OUT THE INVENTION

Hereinafter, the present invention will be further described in detail.

The water-in-oil (W/O) emulsion inks constituting the first and second inks of the present invention can be obtained by mixing an oil phase with a water phase so as to dispersing the water phase as fine particles in the oil phase.

1. Oil Phase

The oil phase is mainly composed of a solvent and a surfactant, and may further contain a coloring material or other components, if necessary.

As the solvent, any of non-polar solvents and polar solvents may be used. These solvents may be used alone or may be used in combination of two or more as long as they form a single phase. Since polar solvents have an interaction with nonionic surfactants due to hydrogen bond and the like, they have a function of increasing storage stability of emulsion. Therefore, it is preferable to use the non-polar solvent together with the polar solvent or the polar solvent alone.

As the non-polar solvent, petroleum based hydrocarbon solvents including naphthenic, paraffinic and isoparaffinic ones can be used. Concrete examples include dodecane and other aliphatic saturated hydrocarbons, "ISOPAR and EXXOL"(both trade names) available from Exxon Mobil Corporation, "AF solvents" (trade name) available from Nippon Oil Corporation, and "SUNSEN and SUNPAR" (both trade names) available from Japan Sun Oil., Ltd. These can be used alone or in combination of two or more.

As the polar solvent, ester solvents, alcohol solvents, higher fatty acid solvents and ether solvents can be used. These can be used alone or in combination of two or more.

The ester solvent includes, for example, higher fatty acid esters having 5 or more, preferably 9 or more and more preferably 12 to 32 carbon atoms in one molecule. Concrete examples include isodecyl isononanoate, isotridecyl isononanoate, isononyl isononanoate, methyl laurate, isopropyl laurate, isopropyl myristate, isopropyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl isostearate, 2-octyldodecyl pivalate, soybean oil methyl ester, soybean oil isobutyl ester, tall oil methyl ester, tall oil isobutyl ester, diisopropyl adipate, diisopropyl sebacate, diethyl sebacate, propylene glycol monocaprate, trimethylolpropane tri-2-ethylhexanoate, and glyceryl tri-2-ethylhexanoate.

The alcohol solvent includes, for example, higher aliphatic alcohols having 12 or more carbon atoms in one molecule. Concrete examples include higher alcohols such as isomyristyl alcohol, isopalmityl alcohol, isostearyl alcohol, and oleyl alcohol.

The higher fatty acid solvent includes, for example, fatty acids having 4 or more, preferably 9-22 carbon atoms in one molecule. Concrete examples include isononanoic acid, isomyristic, acid, hexadecanoic acid, isopalmitic acid, oleic acid, and isostearic acid.

Examples of the ether solvent include glycol ethers such as diethylglycol monobutyl ether, ethylene glycol monobutyl ether, propylene glycol monobutyl ether, and propylene glycol dibutyl ether, and acetate of glycol ethers.

The oil phase preferably comprises a coloring material. The water-in-oil (W/O) emulsion ink used in the present invention usually has a higher ratio of the content of the oil phase than the water phase and thus printing density can be significantly improved by allowing the oil phase to contain a coloring material. As the coloring material, any of dyes and pigments can be used, but pigments are preferable due to high weatherability of prints.

As the pigment, pigments generally used in the technical field of printing, including organic and inorganic pigments, can be used without any particular limitation. Examples thereof which can preferably be used include carbon black, cadmium red, chromium yellow, cadmium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, thioindigo pigments, quinophthalone pigments and metal complex pigments. These pigments can be used alone or in combination of two or more.

As the dye, oil-soluble dyes such as azo, anthraquinone and azine based ones can be used.

The coloring material is contained preferably in an amount of 0.01 to 20 mass % based on the total of the ink. Also, the coloring material is contained preferably in an amount of 0.05 to 25 mass % based on the total of the oil phase.

When a pigment is used as a coloring material, it is preferable to add a pigment dispersing agent to the oil phase in order to improve pigment dispersion in the oil phase. The pigment dispersing agents used in the present invention are not particularly limited as long as they can stably disperse the pigment in a solvent. Examples thereof include a hydroxyl group-containing carboxylic acid ester, a salt of a long-chain polyaminoamide and a high-molecular weight acidic ester, a salt of a high molecular weight polycarboxylic acid, a salt of a long-chain polyaminoamide and a polar acidic ester, a high molecular weight unsaturated acidic ester, a high molecular weight copolymer, a modified polyurethane, a modified polyacrylate, a polyetherester type anionic surfactant, a naphthalene sulfonic acid formalin condensate salt, a polyoxyethylene alkylphosphoric acid ester, a polyoxyethylene nonylphenyl ether, a polyesterpolyamine, a stearylamine acetate and the like. Of these, polymeric dispersing agents are preferably used.

Examples of the dispersing agents include "SOLSPERSE 5000 (phthalocyanine ammonium salt based), 13940 (polyester amine based), 17000, 18000 (aliphatic amine based), 11200, 22000, 24000, and 28000" (all trade names) available from Lubrizol Japan Ltd.; "EFKA 400, 401, 402, 403, 450, 451, 453 (modified polyacrylate), 46, 47, 48, 49, 4010, 4055 (modified polyurethane)" (all trade names) available from Efka Chemicals; "DEMOL P, EP, POIZ 520, 521, 530, HOMOGENOL L-18 (polycarboxylate polymer type surfactants)" (all trade names) available from Kao Corporation; "DISPARLON KS-860, KS-873N4 (high molecular weight polyester amine salt)" (all trade names) available from Kusumoto Chemicals, Ltd.; and "DISCOL 202, 206, OA-202, OA-600 (multi-chain polymer based nonionic)" (all trade names) available from Daiichi Kogyo Seiyaku Co., Ltd.

Of the above pigment-dispersing agents, a polyamide-based dispersing agent that has a pectinated structure constituted by a plurality of side chains composed of polyester is preferably used. The polyamide-based dispersing agent that has a pectinated structure constituted by a plurality of side chains composed of polyester is a compound which has a main chain containing many nitrogen atoms such as polyethylene-imine and has a plurality of side chains that are bonded to the nitrogen atoms through amide-linkage in which the side chains are polyesters. Examples thereof include dispersing agents with a structure that has a main chain formed of polyalkyleneimine such as polyethyleneimine to which poly(carbonyl-$C_{3-6}$-alkyleneoxy) chains are bonded as side chains through amide-linkage in which the poly(carbonyl-$C_{3-6}$-alkyleneoxy) chains each contain 3 to 80 carbonyl-$C_{3-6}$-alkyleneoxy groups, as is disclosed in JP-A-H5-177123. The above SOLSPERSE 11200 and SOLSPERSE 28000 (all trade names) available from Lubrizol Japan Ltd. correspond to the polyamide-based dispersing agent having such a pectinated structure.

Content of the above dispersing agents only has to be an amount in which the above pigment can be sufficiently dispersed in the oil phase, and may be set properly.

The surfactant is not particularly limited as long as it can form a water-in-oil (W/O) emulsion ink, but a nonionic surfactant is preferably used. The nonionic surfactant includes sorbitan higher fatty acid esters such as sorbitan monolaurate, sorbitan monopalmitate, sorbitan monostearate, sorbitan tristearate, sorbitan monooleate, and sorbitan sesquioleate, fatty acid glycerides, polyglycerin fatty acid esters, fatty acid diglycerides, and ethylene oxide addition products of higher alcohols, alkylphenols and fatty acids.

Of these, polyglycerin fatty acid esters are preferred in order to form a stable water-in-oil (W/O) emulsion when it is rich in water. Polyglycerin fatty acid esters herein means esterification products of fatty acids with polyglycerins obtained from dehydrating condensation of glycerin. The polyglycerin fatty acid ester is preferably one which has a degree of polymerization of glycerin of 4 to 12 moles, to which several moles (for example, 1 to 10 moles) of a higher fatty acid are ester-bonded. As the higher fatty acids, fatty acids with 8-24 carbon atoms are preferred, among which hydroxy fatty acids are more preferred. Preferred examples of hydroxy fatty acids include ricinoleic acid, hydroxylauric acid, hydroxymyristic acid, hydroxypalmitic acid, hydroxystearic acid, hydroxybehenic acid, hydroxytridecanoic acid, hydroxypentadecanoic acid, hydroxymargaric acid, hydroxyoctadecanoic acid, hydroxynonadecanoic acid, hydroxyarachic acid, and ricinelaidic acid. Preferred examples of polyglycerin fatty acid esters include decaglyceryl polyricinoleate and hexaglyceryl polyricinoleate.

The HLB of nonionic surfactants is preferably 3 to 8 because the water-in-oil (W/O) emulsion can be easily formed.

The amount of nonionic surfactant to be used in the present invention on solid mass basis is preferably 0.5 to 40 mass %, more preferably 1.0 to 15 mass %, and further more preferably 2.0 to 12 mass % based on the total amount of the ink. If it is less than 0.5 mass %, no improvement of storage stability of emulsion can be expected. Also, if it is more than 40 mass %, viscosity becomes too high to be suitable for inkjet.

The oil phase can be prepared, for example, by putting the whole or parts of the components in a known dispersing machine such as beads-mill to obtain a dispersion and if necessary passing it through a known filtering machine like a membrane filter. For example, it can be prepared by obtaining a mixture of a part of the solvent and the whole of the pigment and the pigment dispersing agent and dispersing them in a dispersing machine, and then adding the rest of the components to the dispersion followed by filtering.

2. Water Phase

The water phase, in case of the first ink, is composed of water and a coloring material dispersed or dissolved therein, and in case of the second ink, is composed of water and a polyvalent metal salt dissolved therein.

The coloring material is not particularly limited as long as it has, on a surface thereof, at least one acid group selected form the group consisting of carboxylic acid group, sulfuric acid group and phosphoric acid group, and is capable of being dispersed in water, and preferably dyes or pigments having an acidic group on a surface thereof, particularly preferably dyes or pigments that have an acidic group on a surface thereof and can self-disperse in water without aid of a dispersing agent. Such self-dispersing dyes or pigments are generally available as aqueous solutions of dyes or aqueous dispersions of self-dispersing pigments. Therefore, the water phase of the first ink can be prepared by diluting such an aqueous solution or aqueous dispersion with an appropriate amount of water, if necessary. As the acidic group, a carboxylic acid group is preferable from the viewpoint that the aggregation is easily caused polyvalent metal salts. As the coloring material, the pigment is preferable because the pigment can provide higher printing density, less strike through and offset and printing image excellent in durability compared with the dye.

Examples of such dye solutions include Pro-jet Fast Black1-Liquid, Projet Fast Black2-Liquid (trade name: Novel Azo colorant available from FUJIFILM Imaging Colorants Co., Ltd.) Examples of such aqueous dispersions of self-dispersing pigments include Cab-O-JET300, Cab-O-JET200, Cab-O-JET250, Cab-O-JET260, and Cab-O-JET 270 (all trade names). The coloring material is preferably contained in an amount of 0.1 to 20 mass % relative to 100 mass % of the total amount of the water phase.

The polyvalent metal salt is not particularly limited as long as it is a salt of divalent or more metal ions which dissolves in water, and includes, for example, divalent or trivalent metal ions. Concrete examples thereof include a salt composed of at least one metal ion selected from the group consisting of $Ca^{++}$, $Cu^{++}$, $Ni^{++}$, $Mg^{++}$, $Zn^{++}$, $Ba^{++}$, $Al^{+++}$, $Fe^{+++}$ and $Cr^{+++}$. Examples of salts include carbonate, sulfate, acetate, phosphate, hydroxide, halide and the like. The water phase of the second ink of the present invention can be a solution of such a polyvalent metal salt in water.

The salt concentration of the water phase of the second ink may be a amount sufficient for effecting aggregation of the coloring material contained in the water phase of the first ink when printing is performed, and is preferably 0.5 to 5.0 mass % relative to 100 mass % of the total amount of the water phase. When the salt concentration is less than 0.5 mass %, improvement of printing density and prevention of strike through or bleeding may not sufficiently achieved. When it is more than 5 mass %, it is not economical but stability of emulsion may be impaired.

The water phase may further contain an electrolyte, a moisturizing agent, a water-soluble polymer, an oil-in-water (O/W) emulsion of resin, a fungicide, an antiseptic, a pH controller, a freeze preventing agent and the like, if necessary.

3. Preparation of Water-in-Oil (W/O) Emulsion Ink

The water-in-oil (W/O) emulsion ink used in the present invention can be produced by mixing the oil phase and the water phase for emulsification. Emulsification can be conducted by previously preparing the water phase and the oil phase separately from each other, and then adding the water phase liquid to the oil phase liquid. Alternatively, emulsification can be conducted after the oil phase components are wholly or separately added to the water phase. A known emulsifying machine such as a disper mixer, a homomixer and the like can be used for the preparation. The water phase dispersed by emulsification preferably has a particle diameter ranging from 0.1 to 2.0 μm.

A water-in-oil (W/O) emulsion ink according to the present invention comprises 60 to 99 mass % of an oil phase and 40 to 1 mass % of a water phase. If the percentage of the water phase exceeds 40 mass %, degree of curl of prints increases and thus conveyance of the prints becomes worse. If the percentage of the water phase is below 1 mass %, printing density may be lowered, or strike through may occur in prints. Generally, there is a tendency that the higher the percentage of the water phase is, the higher the viscosity of the ink becomes. Thus, a blending percentage of the two phases is preferably 75 to 99 mass % of the oil phase and 25 to 1 mass % of the water phase, and more preferably 80 to 95 mass % of the oil phase and 20 to 5 mass % of the water phase.

4. Inkjet Printing Method

The inkjet printing method of the present invention is conducted by ejecting one of the first and second inks onto a printing medium, and then successively ejecting the other ink so as to overlay it on the one ink.

It is advantageous to constitute and market an ink set comprising at least the first and second inks in order to make it easier to carry out the inkjet printing method of the present invention.

For example, when an ordinary inkjet printer equipped with an ink head having ejection nozzles for cyan (C), yellow (Y), magenta (M) and black (K) is used to conduct the printing method of the present invention in order to improve printing density of black color, the printing method of the present invention can be easily conducted by preparing a black ink as the first ink and a cyan ink as the second ink, and controlling the inkjet printer so that when the black ink is ejected onto a printing medium, the cyan ink is successively ejected so as to overlay it on the site which has been printed by the black ink. Conversely, the black ink may be prepared as the second ink and the cyan ink as the first ink. Further, two kinds of black ink may be equipped with a printer whilst one is prepared as the first ink and the other as the second ink. The printing density of other colors can be improved in a manner similar to the above. The second ink may be provided as a colorless ink containing no coloring material, that is, as a treatment agent, in addition to the various colored inks such as cyan (C), yellow (Y), magenta (M) and black (K) inks.

In the present invention, the printing medium is not particularly limited, and may be plain paper, glossy paper, specialty paper, fabrics, films, OHP sheets, and the like. Especially, according to the present invention, even when a plain paper is printed, the coloring material which is contained in the water phase of the first ink aggregates and stays on the surface of printing paper without permeating through the printing paper, and thus great advantages result including improvement of printing density and decrease in strike through and bleeding. Also, according to the present invention, even when the coloring material is contained in either of the oil and water phases, effect of fillers of the printing paper can be obtained by aggregation of the above coloring material so that the coloring material stays on the surface of the printing paper without permeating through the printing paper, and consequently printing density is improved, and strike through and bleeding are decreased.

EXAMPLE

Hereinafter, the present invention will be described in detail by way of Examples and Comparative Examples, however, the present invention is not limited to these Examples.

Production Example

Production of a Water-in-Oil (W/O) Emulsion

A pigment, a pigment dispersing agent and a solvent A of the oil phase shown in Table 1 were premixed in the blending amounts shown in Table 1, and then the mixture was dispersed in a beads mill (using zirconium beads having a diameter (φ) of 0.5 mm). The resulting dispersion was filtered with a membrane filter (having pore diameter of 3 μm) to obtain a pigment dispersion.

Then, a solvent B and a surfactant shown in Table 1 were mixed in the blending amounts shown in Table 1 to obtain the oil phase.

A water-in-oil (W/O) emulsion ink was prepared by placing the resulting oil phase in a high-speed homogenizer PHYSCOTRON available from Microtech Nichion, dropping therein a water phase comprising a coloring material, water and a metal salt under stirring for 5 minutes at 3,000 rpm, and then stirring for 5 minutes at 10,000 rpm.

Examples 1-6

Comparative Examples 1-5

Inks shown in Table 2 were selected from the inks shown in Table 1 as the first and second inks, and respectively introduced to the first ink ejection route and the second ink ejection route of the inkjet printer HC5500 (trade name; manufactured by RISO KAGAKU CORPORATION). Using plain paper (RISO-YOSHI, Usukuchi (trade name; manufactured by RISO KAGAKU CORPORATION)) as printing paper, solid image was printed such that ink dots ejected from the first ink ejection route onto the printing paper were overlaid with ink dots ejected from the second ink ejection route. Meanwhile, printing was carried out with two modes: a 300 (horizontal scan)×300 (vertical scan) dpi mode and a 300 (horizontal scan)×600 (vertical scan) dpi mode. Printing density, strike through and curls of the resulting prints were measured according to the following standards, and evaluated. The results are shown in Table 2.

Printing density of prints: Printing image density (OD) value on the front side of the resulting print was measured with an optical densitometer (RD920: manufactured by Macbeth), and evaluated according to the following standards.

Evaluation Standards:
A: $1.2 \leqq$ OD value
B: $1.1 \leqq$ OD value $<1.2$
C: OD value $<1.1$ Strike through of prints: Printing image density (OD) value on the back side of the resulting print was measured with an optical densitometer (RD920: manufactured by Macbeth), and evaluated according to the following standards.
Evaluation Standards:
A: OD value≦0.20
B: 0.20<OD value≦0.25
C: 0.25<OD value
Curl of prints: A solid image was printed, and a 5 cm×10 cm square paper piece was cut from the solid image part. After the cut paper piece was left in an environment at a room temperature of 23° C. and 50% humidity for 2 hours, it was measured for an amount of curls and evaluated according to the following standards.
Evaluation Standards:
A: less than 15 mm
B: not less than 15 mm M-OL: "EXEPARL M-OL (trade name)" available from KAO CHEMICAL (methyl oleate).
AF7: "AF7 (trade name)" available from Nippon Oil Corporation (naphthenic solvent).
IOP: "NIKKOL IOP (trade name)" available from Nikko Chemical Corporation (isooctyl palmitate).
HCO10: "NIKKOL HCO10 (trade name)" available from Nikko Chemical Corporation (polyoxyethylene (10) hydrogenated castor oil, HLB 6.5).
SP-P10: "RHEODOL SP-P10 (trade name)" available from KAO CHEMICAL (sorbitan monopalmitate, HLB 6.7).
AO-15V: "RHEODOL AO-15V (trade name)" available from KAO CHEMICAL (sorbitan sesquioleate, HLB 6.7).
Black dye aqueous solution: "Pro-jetFastBlack1-Liquid (trade name)" available from FUJIFILM Imaging Colorants Co., Ltd. (black dye 12% aqueous solution, pH=8-9.5).

TABLE 1

| | | Common name | Abbreviation | First ink | | Second ink | | | | | | | | | |
|---|---|---|---|---|---|---|---|---|---|---|---|---|---|---|---|
| | | | | A-1 | A-2 | B-1 | B-2 | B-3 | B-4 | B-5 | B-6 | BH-1 | BH-2 | BH-3 | BH-4 |
| Oil phase | Pigment | Carbon black | MA11 | 7.00 | 7.00 | | | | 7.00 | | 7.00 | | | | |
| | | Phthalocyanine pigment | 4044 | | | 7.00 | 7.00 | 7.00 | | 7.00 | 7.00 | | 7.00 | 7.00 | 7.00 |
| | Pigment dispersing agent | Polymer pigment dispersing agent | S28000 | 2.20 | 2.20 | 2.20 | 2.20 | 2.20 | 2.20 | 2.20 | 2.20 | 2.20 | 2.20 | 2.20 | 2.20 |
| | Solvent A | Methyl oleate | M-OL | 8.40 | 8.40 | 8.40 | 8.40 | 8.40 | 8.40 | 8.40 | 8.40 | 8.40 | 8.40 | 8.40 | 8.40 |
| | | Naphthenic solvent | AF7 | 8.40 | 8.40 | 8.40 | 8.40 | 8.40 | 8.40 | 8.40 | 8.40 | 8.40 | 8.40 | 8.40 | 8.40 |
| | Solvent B | Methyl oleate | M-OL | 36.60 | 36.57 | 35.00 | 35.00 | 35.00 | 35.00 | 35.00 | 35.00 | 35.00 | 35.00 | 35.00 | 35.00 |
| | | Isooctyl palmitate | IOP | 1.63 | | | | | | | | | | | |
| | | Naphthenic solvent | AF7 | 27.10 | 27.00 | 27.00 | 27.00 | 27.00 | 27.00 | 27.00 | 27.00 | 27.00 | 27.00 | 27.00 | 27.00 |
| | Surfactant | POE (10) hydrogenated castor oil | HCO10 | 2.00 | | | | | 2.00 | | | | | | |
| | | Sorbitan monopalmitate | SP-P10 | | | 2.00 | 2.00 | 2.00 | | 2.00 | 2.00 | | 2.00 | 2.00 | 2.00 |
| | | Sorbitan sesquialeate | AO-15V | | 2.00 | | | | | | | | 2.00 | | |
| Water phase | Coloring material | Black dye aqueous solution | Commercially available | | 1.00 | | | | | | | | | | |
| | | Black self-dispersing pigment aqueous dispersion | Commercially available | 1.00 | | | | | | | | | | | |
| | Water | | | 5.67 | 7.33 | 9.8 | 9.95 | 9.6 | 9.8 | 9.8 | 9.8 | 9.8 | 9.8 | 9.8 | 10 |
| | Polyvalent metal salt | Calcium carbonate | | | | 0.2 | 0.05 | 0.4 | 0.2 | | | | | | |
| | | Magnesium sulfate | | | | | | | | 0.2 | | | | | |
| | | Aluminum sulfate | | | | | | | | | 0.2 | | | | |
| | Monovalent metal salt | Lithium hydroxide | | | | | | | | | | 0.2 | | | |
| | | Potassium sulfate | | | | | | | | | | | 0.2 | | |
| | | Potassium phosphate | | | | | | | | | | | | 0.2 | |
| Water ratio in water phase (%) | | | | 85 | 88 | 98 | 99.5 | 96 | 98 | 98 | 98 | 98 | 98 | 98 | 100 |
| Solid matter ratio in water phase (%) | | | | 15 | 12 | 2 | 0.5 | 4 | 2 | 2 | 2 | 2 | 2 | 2 | 0 |
| Amount of water (part) | | | | 5.67 | 7.33 | 9.80 | 9.95 | 9.60 | 9.80 | 9.80 | 9.80 | 9.80 | 9.80 | 9.80 | 10 |
| Amount of solid matter in water phase (part) | | | | 1.00 | 1.00 | 0.20 | 0.05 | 0.40 | 0.20 | 0.20 | 0.20 | 0.20 | 0.20 | 0.20 | 0 |

Meanwhile, details of materials shown in Table 1 are as follows.
MA11: "MA-11 (trade name)" available from Mitsubishi Chemical Corporation, (carbon black).
4044: "Cyanine Blue 4044 (trade name)" available from Sanyo Color Works, LTD. (phthalocyanine pigment).
S28000: "SOLSPERSE 28000 (trade name)" available from Lubrizol Japan Ltd., (a pigment dispersing agent).

Black self-dispersing pigment aqueous dispersion (commercially available): "Cab-O-JET300 BLACK (trade name)" available from Cabot Corporation (an aqueous dispersion of 15 mass % concentration of carbon black particles which have carboxylic acid groups (with sodium ions as counter ions) attached to a surface thereof).
Polyvalent metal salt and monovalent metal salt: All available from Wako Pure Chemical Industries, Ltd.

TABLE 2

|  |  | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| First ink | | A-2 | A-2 | A-2 | A-2 | A-1 | A-2 | A-2 | A-2 | A-1 | A-2 | Oil ink |
| Second ink | | B-1 | B-2 | B-3 | B-4 | B-5 | B-6 | BH-1 | BH-2 | BH-3 | BH-4 | Oil ink |
| Evaluation items | Surface concentration (300 × 300 dpi mode) | A | A | A | A | A | A | B | B | B | B | B |
| | Strike through (300 × 300 dpi mode) | A | A | A | A | A | A | A | B | B | B | B |
| | Surface concentration (300 × 600 dpi mode) | A | A | A | A | A | A | B | B | B | B | B |
| | Strike through (300 × 600 dpi mode) | A | A | A | A | A | A | B | B | B | B | C |
| | Curl of prints (300 × 600 dpi mode) | A | A | A | A | A | A | A | A | A | A | A |

The results of Table 2 have revealed as follows:

In Examples 1-6 in which a water-in-oil (W/O) emulsion ink comprising a dye aqueous solution or self-dispersing pigment aqueous dispersion as the water phase was used as the first ink and a water-in-oil (W/O) emulsion ink comprising a polyvalent metal salt in the water phase was used as the second ink, sufficient printing density can be obtained, and at the same time, strike through was prevented, and no curl of prints occurred.

In contrast, in Comparative Examples 1-3 in which a water-in-oil (W/O) emulsion ink comprising a monovalent metal salt in the water phase was used as the second ink, printing density was low and strike through occurred. Also, in Comparative Example 4 in which a water-in-oil (W/O) emulsion ink comprising no polyvalent metal salt in the water phase was used as the second ink, printing density was low and strike through occurred. In Comparative Example 5 in which an oil ink (an ink comprising only the oil phase of Example 1) was used as both the first and second inks, printing density was low and strike through remarkably occurred.

Industrial Applicability

The inkjet printing method and ink set of the present invention can be easily practiced in an inkjet printer which can perform printing by successively ejecting the first and second inks from a nozzle head so as to overlay them on a printing medium, and thus can be used widely in the field of inkjet printing.

The invention claimed is:

1. An inkjet printing method which comprises ejecting one of first and second inks onto a printing medium, and then successively ejecting the other ink so as to overlay it on the one ink, wherein the first ink is a water-in-oil (W/O) emulsion ink comprising a coloring material in a water phase thereof, said coloring material having an acidic group on a surface thereof, and wherein the second ink is a water-in-oil (W/O) emulsion ink comprising a polyvalent metal salt in a water phase thereof.

2. The inkjet printing method of claim 1, wherein the coloring material contained in the water phase of the first ink is one having, on a surface thereof, at least one acidic group selected from the group consisting of carboxylic acid group, sulfuric acid group and phosphoric acid group, and the polyvalent metal salt contained in the water phase of the second ink is one constituted by at least one metal ion selected from the group consisting of $Ca^{++}$, $Cu^{++}$, $Ni^{++}$, $Mg^{++}$, $Zn^{++}$, $Ba^{++}$, $Al^{+++}$, $Fe^{+++}$ and $Cr^{+++}$.

3. The inkjet printing method of claim 2, wherein the coloring material is a dye or self-dispersing pigment having a carboxylic acid group on a surface thereof.

4. The inkjet printing method of claim 3, wherein the first ink and/or the second ink further comprises a coloring material in an oil phase thereof.

5. An ink set for inkjet printing by ejecting one of first and second inks onto a printing medium, and then successively ejecting the other ink so as to overlay it on the one ink, wherein the first ink is a water-in-oil (W/0) emulsion ink comprising a coloring material in a water phase, said coloring material having an acidic group on a surface thereof, and wherein the second ink is a water-in-oil (W/O) emulsion ink comprising a polyvalent metal salt in a water phase thereof.

6. The ink set for inkjet printing of claim 5, wherein the coloring material contained in the water phase of the first ink is one having, on a surface thereof, at least one acidic group selected from the group consisting of carboxylic acid group, sulfuric acid group and phosphoric acid group, and the polyvalent metal salt contained in the water phase of the second ink is one constituted by at least one metal ion selected from the group consisting of $Ca^{++}$, $Cu^{++}$, $Ni^{++}$, $Mg^{++}$, $Zn^{++}$, $Ba^{++}$, $Al^{+++}$, $Fe^{+++}$ and $Cr^{+++}$.

7. The ink set for inkjet printing of claim 6, wherein the coloring material is a dye or self-dispersing pigment having a carboxylic acid group on a surface thereof.

8. The ink set inkjet printing of claim 7, wherein the first ink and/or the second ink further comprises a coloring material in an oil phase thereof.

* * * * *

UNITED STATES PATENT AND TRADEMARK OFFICE
CERTIFICATE OF CORRECTION

PATENT NO. : 8,231,722 B2  
APPLICATION NO. : 12/576870  
DATED : July 31, 2012  
INVENTOR(S) : Shunsuke Uozumi et al.

Page 1 of 1

It is certified that error appears in the above-identified patent and that said Letters Patent is hereby corrected as shown below:

Title Page Item (54), and in the Specification, Column 1, line 1

"Title" should be changed from Injet Printing Method and Ink Set to INKJET PRINTING METHOD AND INK SET Signed and Sealed this  
Second Day of July, 2013

Teresa Stanek Rea  
*Acting Director of the United States Patent and Trademark Office*